No. 676,928. Patented June 25, 1901.
C. O. ULLIN & H. H. NIEMEYER
SPRING FOR CAR SEATS.
(Application filed Nov. 3, 1900.)
(No Model.)

WITNESSES:
Carl Stowe
Matthew Siebler

INVENTORS
C. O. Ullin
H. H. Niemeyer
By R. J. McCarty
their ATTORNEY

UNITED STATES PATENT OFFICE.

CHARLES O. ULLIN, OF DAYTON, OHIO, AND HERMAN H. NIEMEYER, OF ST. CHARLES, MISSOURI.

SPRING FOR CAR-SEATS.

SPECIFICATION forming part of Letters Patent No. 676,928, dated June 25, 1901.

Application filed November 3, 1900. Serial No. 35,337. (No model.)

*To all whom it may concern:*

Be it known that we, CHARLES O. ULLIN, residing at Dayton, county of Montgomery, and State of Ohio, and HERMAN H. NIEMEYER, residing at St. Charles, county of St. Charles, and State of Missouri, citizens of the United States, have invented certain new and useful Improvements in Springs for Car-Seats; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in springs for car-seats.

One object of the invention is to provide a car-seat spring which is connected in a manner that prevents any part of the spring from becoming separated or from receiving pressure which is not equally borne by the entire spring.

Another object of the invention is to do away with the use of all webbing or twine which is commonly used as a means for holding springs in place and which affords a place for bugs and other insects to thrive in, which is objectionable from a sanitary point of view. To this end we provide a spring which is metallic throughout.

In a detail description of the invention reference is made to the accompanying drawings, of which—

Figure 1:
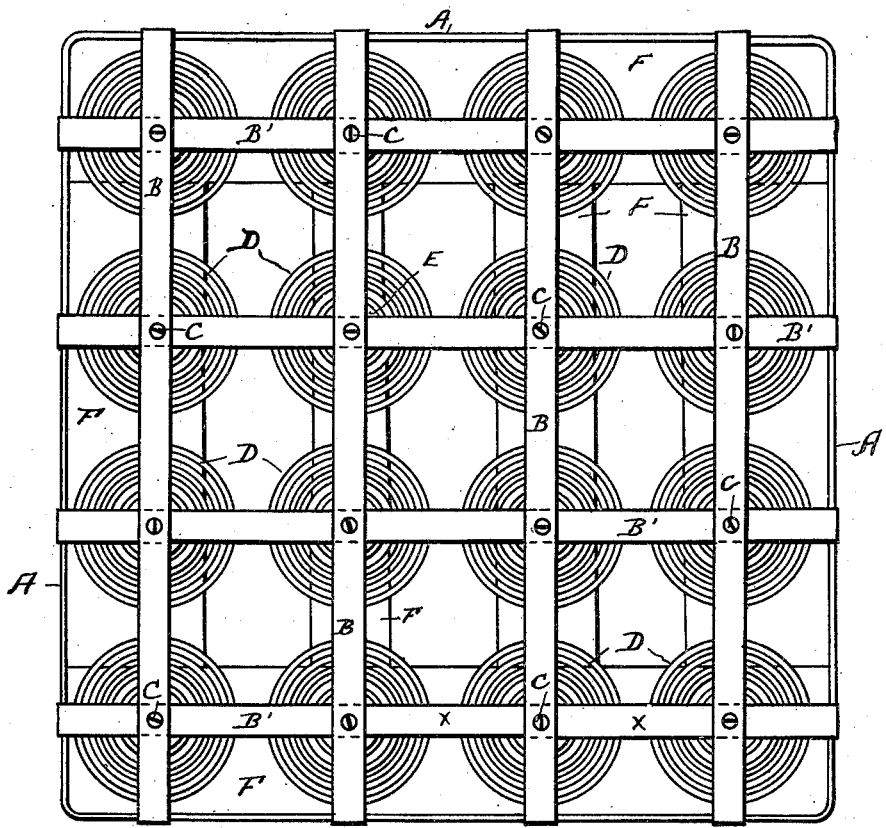
Figure 2:
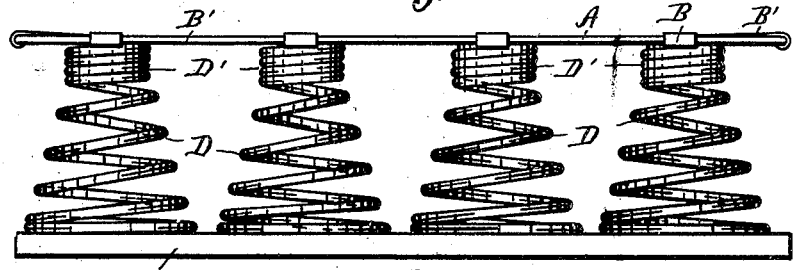
Figure 3:
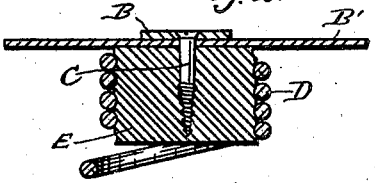

Figure 1 is a top plan view of a spring constructed in accordance with our invention. Fig. 2 is an end elevation. Fig. 3 is an enlarged sectional elevation on the line $x\ x$ of Fig. 1.

The spring, as shown in the drawings, Figs. 1 and 2, is made up of a suitable number of open conical-shaped springs D. These springs D are suitably mounted upon a base consisting of cross-pieces F, which are joined in the manner shown. The upper portion D' of each of said coil-springs is closed and is of uniform diameter throughout said closed portion. All of the springs are constructed in this manner, and the upper closed end D' provides male threads for blocks E, which may be constructed of metal or wood or any suitable material. These blocks E are of uniform diameter, and their outer peripheries are provided with female threads, by means of which the said blocks E are screwed into the upper closed end D' of the springs, and thereby the blocks or screws are securely attached to the springs and afford efficient means for the attachment of the cross-strips B and B'. These cross-strips lie across each other and are pierced at the points where they cross with screws or rivets C, which penetrate the screw-blocks E, and the entire series of springs thus become securely connected to the cross-pieces B and B'.

Surrounding the spring as a whole is a rectangular frame A, made of any suitable material, preferably of steel. This frame is large enough to inclose the outer sides of the entire series of springs D. The ends of the cross-strips B and B' are clamped to said frame and secured in the manner shown in Fig. 2. When the rectangular frame A and the cross-pieces and the springs are thus united, any lateral pressure on the frame A or any pressure on any portion of the springs or the strips will be transmitted through the entire springs, which is owing to the manner in which the connections between the different springs and the parts are made.

Having described our invention, we claim—

1. In a spring, the combination of a single cone-shaped spring having its small end terminating in closed coils of uniform diameter forming male threads, a block having female threads on its periphery by means of which it is screwed into said closed end of the spring flush with the upper end of said spring, substantially as specified.

2. In a spring for car-seats or other purposes, a series of single conical-shaped springs having their small ends consisting of several closed coils of uniform diameter, blocks screwed into said closed coils and occupying positions flush with the upper ends of said springs, a series of cross-pieces rigidly secured to said blocks, and a frame surrounding said springs and to which the cross-pieces are secured.

In testimony whereof we affix our signatures in presence of witnesses.

CHARLES O. ULLIN.
HERMAN H. NIEMEYER.

Witnesses as to signature of Charles O. Ullin:
JOHN W. KALBFUS,
R. J. MCCARTY.

Witnesses as to signature of Herman H. Niemeyer:
MATTHEW SUBBE,
C. THEOBALD.